(12) United States Patent
Nakagawa et al.

(10) Patent No.: US 9,081,641 B2
(45) Date of Patent: Jul. 14, 2015

(54) COMMUNICATION DEVICE, UPDATE METHOD, AND COMPUTER-READABLE STORAGE MEDIUM

(75) Inventors: Masaki Nakagawa, Kanagawa (JP); Takahiro Asai, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 301 days.

(21) Appl. No.: 13/494,299

(22) Filed: Jun. 12, 2012

(65) Prior Publication Data

US 2013/0019236 A1 Jan. 17, 2013

(30) Foreign Application Priority Data

Jul. 12, 2011 (JP) .................................. 2011-154311

(51) Int. Cl.
G06F 9/44 (2006.01)
G06F 9/445 (2006.01)

(52) U.S. Cl.
CPC ........................................ G06F 8/65 (2013.01)

(58) Field of Classification Search
CPC ............... G06F 8/65; G06F 8/67; G06F 8/68; G06F 8/61; G06F 8/71
See application file for complete search history.

(56) References Cited

U.S. PATENT DOCUMENTS

| 5,999,740 | A | 12/1999 | Rowley |
| 6,847,403 | B1 | 1/2005 | Forsberg, Jr. et al. |
| 7,890,989 | B1 | 2/2011 | Hofrichter et al. |
| 2002/0069213 | A1 | 6/2002 | Moslander et al. |
| 2005/0144614 | A1 | 6/2005 | Moslander et al. |
| 2005/0228798 | A1 | 10/2005 | Shepard et al. |
| 2006/0031827 | A1 | 2/2006 | Barfield et al. |
| 2009/0328026 | A1* | 12/2009 | Yamashita et al. ............ 717/170 |

(Continued)

FOREIGN PATENT DOCUMENTS

| CN | 1834913 A | 9/2006 |
| EP | 0 841 615 A2 | 5/1998 |

(Continued)

OTHER PUBLICATIONS

The Extended European Search Report issued Nov. 23, 2012, in Application No. Patent No. 12172659.0-2211.

(Continued)

*Primary Examiner* — Anna Deng
(74) *Attorney, Agent, or Firm* — Oblon, McClelland, Maier & Neustadt, L.L.P.

(57) ABSTRACT

A communication device includes a first receiving unit configured to receive first metainformation indicating a target update required for a program of the communication device from an update information providing device, the first metainformation including information about a dependency version that is another version of update dependent upon the target update; a determining unit configured to determine whether the dependency version is newer than a device version which is a current version of update of the communication device; a second receiving unit configured to receive second metainformation indicating an update for the dependency version from the update information providing device if the dependency version is newer than the device version; and an update process unit configured to execute the update for the dependency version on the basis of the second metainformation and execute the target update based on the first metainformation after executing the update for the dependency version.

11 Claims, 17 Drawing Sheets

(56) References Cited

U.S. PATENT DOCUMENTS

| | | | |
|---|---|---|---|
| 2010/0107198 A1* | 4/2010 | Eum | 725/56 |
| 2011/0209133 A1* | 8/2011 | Mahajan et al. | 717/170 |

FOREIGN PATENT DOCUMENTS

| | | |
|---|---|---|
| EP | 1 585 287 A2 | 10/2005 |
| JP | 09-190341 | 7/1997 |
| JP | 2005-92623 | 4/2005 |
| JP | 2011-18353 | 1/2011 |
| JP | 2012-84118 A | 4/2012 |

OTHER PUBLICATIONS

Japanese Office Action mailed Jan. 27, 2015, in Patent Application No. 2011-154311.

Chinese Office Action issued Apr. 14, 2015, in Patent Application No. 201210241843.1 with English translation.

* cited by examiner

FIG.6

EXAMPLE OF METADATA

```
{
 "version": "1.0.1",
 "description":"It is sample data.",
 "package_url": "https://update.example.jp/1.0.1/update.cab",
 "package_digest":"abc1def2abc1def2abc1def2abc1def2abc1def2",
 "execute": "update.dup",
 "reboot": true,
 "critical": false,
 "dependency": true,
 "dependency_version": "1.0.0"
 "dependency_metadata_url": " https://update.example.jp/1.0.0/metadata.json"
}
```

FIG.15 update.dup

```
// CREATE UPDATE DIRECTORY IN Z DRIVE
CREATEDIRECTORY,,,Z\UPDATE

// MOVE FILE
MOVEFILE,,,Z:\Temp\update.exe,Z:\UPDATE\update.exe

// HALT PROCESSING FOR FIVE SECONDS
DELAY,,5
```

COMMUNICATION DEVICE, UPDATE METHOD, AND COMPUTER-READABLE STORAGE MEDIUM

CROSS-REFERENCE TO RELATED APPLICATIONS

The present application claims priority to and incorporates by reference the entire contents of Japanese Patent Application No. 2011-154311 filed in Japan on Jul. 12, 2011.

BACKGROUND OF THE INVENTION

1. Field of the Invention

The present invention relates to a communication device, an update method, and a computer-readable storage medium.

2. Description of the Related Art

In recent years, with an increasing demand to cut back on expenses and time spent for business trips, communication terminals for performing a teleconference through a communication network such as the Internet are widely prevailed. Each communication terminal designates the communication terminal of the destination to start a call, and hence transmission and reception of image data and voice data are performed. In this way, the teleconference is performed.

In order to improve the conversation encryption performance and the operational performance, a firmware (program) is updated in this communication terminal with a regular interval. With regard to update of the program in this communication terminal, U.S. Pat. No. 7,890,989 is known. U.S. Pat. No. 7,890,989 indicates that update data and metainformation are obtained by accessing a server via a network, and a program and programs of versions depending on the program in question are updated.

Therefore, there is a need for a communication device, an update method, and a computer-readbale storage medium, capable of reducing the use of a network bandwidth and reducing network load and capable of easily perform the update process in a short time.

SUMMARY OF THE INVENTION

According to an embodiment, there is provided a communication device that includes a first receiving unit configured to receive first metainformation indicating a target update required for a program of the communication device from an update information providing device, the first metainformation including information about a dependency version that is another version of update dependent upon the target update; a determining unit configured to determine whether the dependency version is newer than a device version which is a current version of update of the communication device; a second receiving unit configured to receive second metainformation indicating an update for the dependency version from the update information providing device if the dependency version is newer than the device version; and an update process unit configured to execute the update for the dependency version on the basis of the second metainformation and execute the target update on the basis of the first metainformation after executing the update for the dependency version.

According to another embodiment, there is provided an update method executed by a communication device. The update method includes receiving first metainformation indicating a target update required for a program of the communication device from an update information providing device, the first metainformation including information about a dependency version that is another version of update dependent upon the target update; determining whether the dependency version is newer than a device version which is a current version of update of the communication device; receiving second metainformation indicating an update for the dependency version from the update information providing device if the dependency version is newer than the device version; and executing the update for the dependency version on the basis of the second metainformation and executing the target update on the basis of the first metainformation after executing the update for the dependency version.

According to still another embodiment, there is provided a non-transitory computer-readable storage medium with an executable program stored thereon. The program instructs a processor of a communication device to perform receiving first metainformation indicating a target update required for a program of the communication device from an update information providing device, the first metainformation including information about a dependency version that is another version of update dependent upon the target update; determining whether the dependency version is newer than a device version which is a current version of update of the communication device; receiving second metainformation indicating an update for the dependency version from the update information providing device if the dependency version is newer than the device version; and executing the update for the dependency version on the basis of the second metainformation and executing the target update on the basis of the first metainformation after executing the update for the dependency version.

The objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a conceptual diagram illustrating an example of metadata according to the embodiment;

FIG. 15 is an explanatory diagram illustrating an example of a script according to the embodiment;

DETAILED DESCRIPTION OF THE PREFERRED EMBODIMENTS

Hereinafter, an embodiment of the invention will be described in detail with reference to the accompanying drawings.

Figure 1:
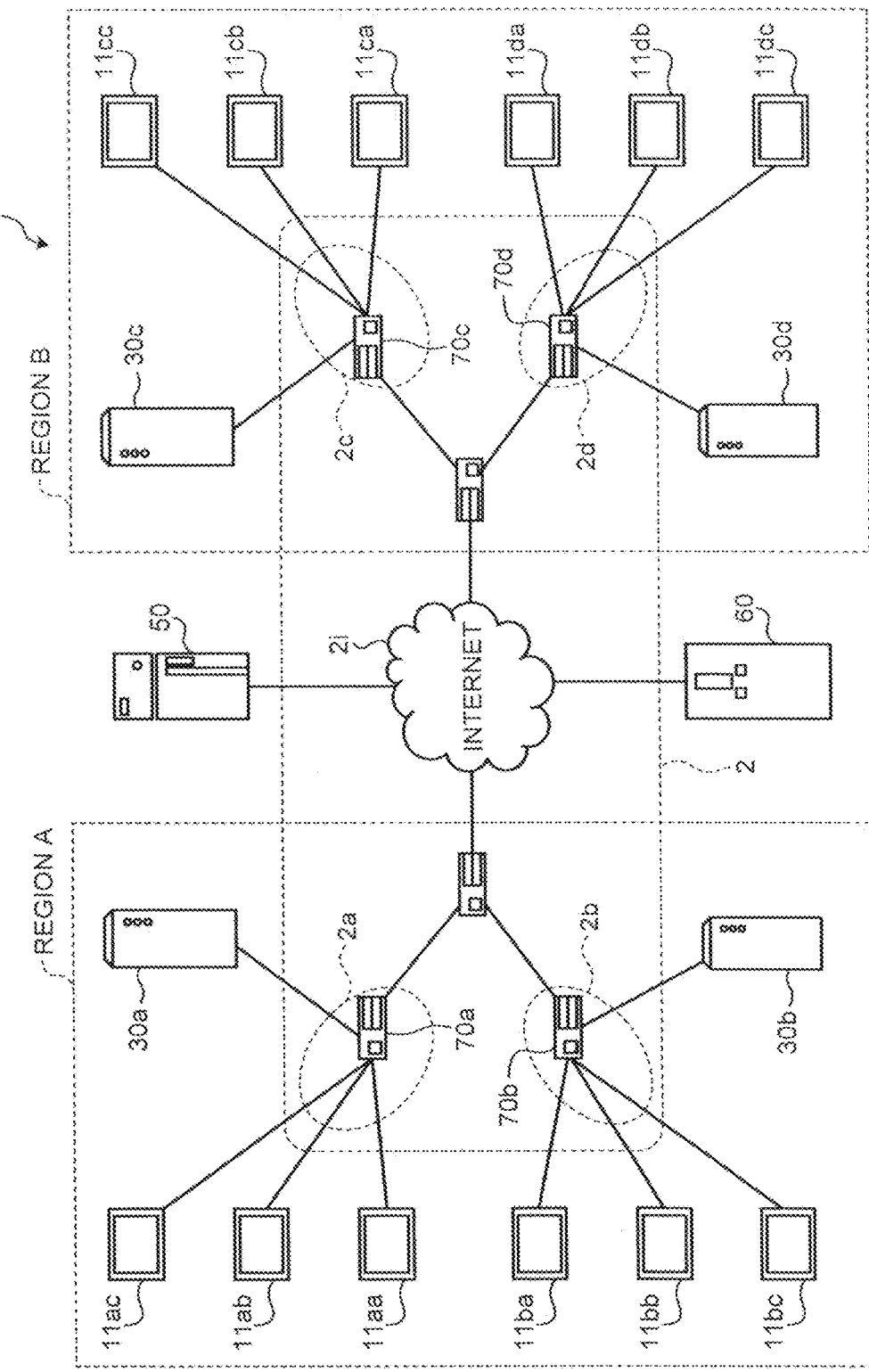
FIG. 1 is a schematic diagram illustrating an example of the configuration of a remote communication system according to an embodiment.

FIG. 1 is a schematic diagram illustrating an example of the configuration of a remote communication system 1 according to an embodiment. As illustrated in FIG. 1, the remote communication system 1 is a system in which communication terminals 11aa to 11ac, 11ba to 11bc, 11ca to 11cc, and 11da to 11dc functioning as communication devices, a remote communication management server 50, an update server 60, and routers 70a to 70d are connected by a communication network 2 to communicate with each other. Specifically, the remote communication system 1 includes local area networks (LANs) 2a, 2b, 2c, and 2d, the remote communication management server 50, and the update server 60 that are connected to the Internet 2i through the routers 70a to 70d, the communication terminals 11aa to 11ac and a relay device 30a that are connected to the LAN 2a, the communication terminals 11ba to 11bc and a relay device 30b that are connected to the LAN 2b, the communication terminals 11ca to 11cc and a relay device 30c that are connected to the LAN 2c, and the communication terminals 11da to 11dc and a relay device 30d that are connected to the LAN 2d. In the remote communication system 1, under the management of the remote communication management server 50, the communication terminals 11aa to 11ac and 11ba to 11bc of a region A and the communication terminals 11ca to 11cc and 11da to 11dc of a region B can exchange a voice or an image with each other through relaying of communication data via the relay devices 30a, 30b, 30c, and 30d.

Specifically, the remote communication management server 50 manages communication addresses of the communication terminals 11aa to 11ac, 11ba to 11bc, 11ca to 11cc, and 11da to 11dc and the relay devices 30a, 30b, 30c, and 30d and information of the communication terminals relayed by the relay devices 30a, 30b, 30c, and 30d and call statuses of the communication terminals. For example, when the communication terminal 11aa calls the communication terminal 11ca, the remote communication management server 50 requests the relay device 30a to relay a call to the communication terminal 11ca. The relay device 30a notifies the remote communication management server 50 that a call of the communication terminal 11aa starts, and acquires, from the remote communication management server 50, the communication address of the relay device 30c to relay a call to the communication terminal 11ca. Next, the relay device 30a requests the relay device 30c to relay a call to the communication terminal 11ca and the relay device 30c starts a communication session with the communication terminal 11ca.

Then, the relay device 30c notifies the remote communication management server 50 of the start of the communication session with the communication terminal 11ca.

In this way, a call between the communication terminal 11aa and the communication terminal 11ca is started through the relay devices 30a and 30c. The remote communication management server 50 manages a call between the communication terminal 11aa and the communication terminal 11ca. For example, when the communication terminal 11ab inquires of the remote communication management server 50 about a call status of the communication terminal 11aa or the communication terminal 11ca, the remote communication management server 50 returns that the communication terminal 11aa or the communication terminal 11ca are on-line and calling each other.

In the description below, reference numerals that are obtained by removing alphanumerical characters assigned after the numerical characters are used when any one of the devices of the same type is described. For example, the communication terminals 11aa to 11ac, 11ba to 11bc, 11ca to 11cc, and 11da to 11dc are abbreviated as a communication terminal 11. The relay devices 30a to 30d are abbreviated as a relay device 30.

The update server 60 is an update information providing device that manages information related to update of the program or various setting information of the communication terminal 11 with the update program and provides the information according to a request by the communication terminal 11. Examples of the information that are related to the update include data files of all the versions, from the past to the latest versions, of the programs or the various setting information of the communication terminal 11 and metadata (metainformation) where contents of the update for each version are described. The reason why the data of all of the versions are managed as the information related to the update by the update server 60 is because each communication terminal 11 performs update with different timing.

For example, it may be sufficient for the communication terminal 11 that frequently executes the update to perform the update with a latest version. However, the communication terminal 11 that has a long update interval may execute the update after several times of updating has been done for the versions. In this case, instead of executing directly the update with the latest version, the update may be first performed with an older version on which the latest version is dependent. As such, since the communication terminal 11 may first execute the update with the older version on which the latest version is dependent, the update server 60 manages data of all of the versions as the information related to the update.

Note that there are two kinds of updates: a normal update and a forced update. The normal update is an update that is executed for the purpose of removing obstacles, such as bug fixing, or function addition.

The forced update is an update that is compulsorily executed in association with a change of a device or a function to which the current functions of the communication terminal 11 cannot respond. For example, there may be a change that can be executed, on the side of the relay device 30, in the data format or the video codec of a voice or an image that is transmitted and received at the time of calling or a version-up of the relay device 30 related to an update of an encoder. Further, a communication protocol with the relay device 30 may be changed. The changes listed above may cause a change in the structure of the voice, the image, and the video, a communication method with the relay device 30 associated to the change in the communication protocol, or the function of the relay device 30. Accordingly, a call that is an original function of the communication terminal 11 may not be realized with the communication terminal 11 before an update. In such an occasion, therefore, the forced update is executed on the communication terminal 11 to match the version of the relay device 30 after the update.

When a problem occurs in the security on the side of the relay device 30 such as a security hole that is found in the relay device 30, for example, an update in response to the security hole may be executed on the side of the relay device 30. In this case again, since the communication terminal 11 before the update may not execute even a call, the forced update is executed on the communication terminal 11 so as to match the version of a computer program that copes with the security hole on the side of the relay device 30.

Figure 2:
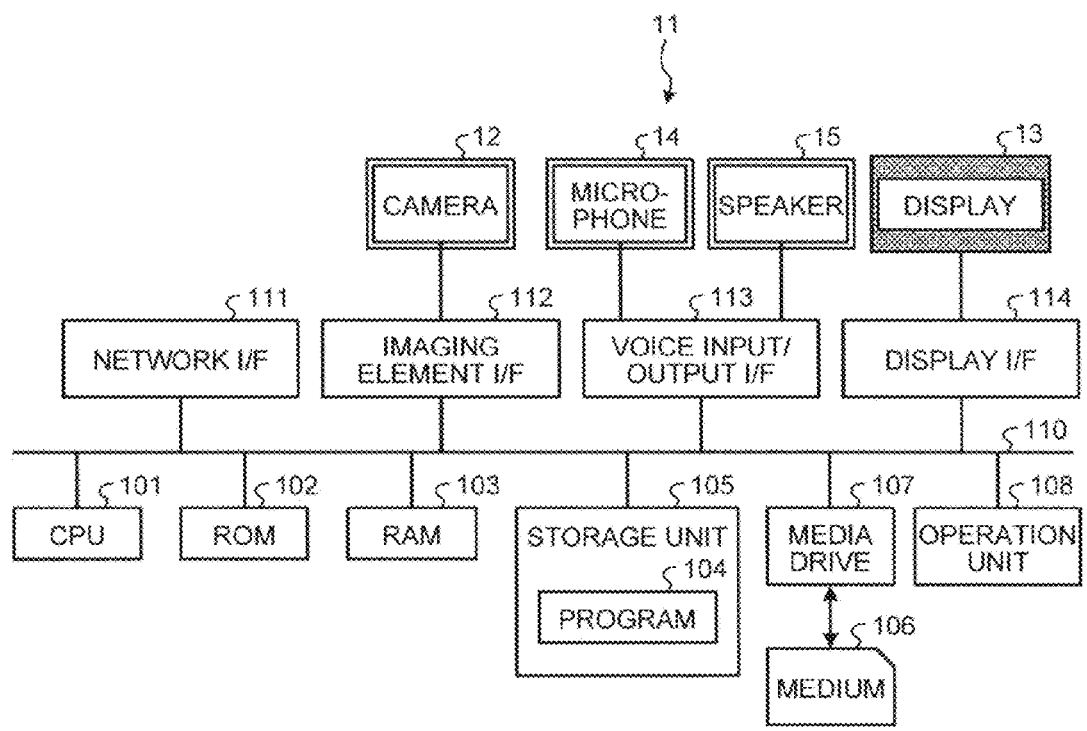
FIG. 2 is a block diagram illustrating an example of the hardware configuration of a communication terminal according to the embodiment.

Next, the hardware configuration of the communication terminal 11 will be described. FIG. 2 is a block diagram illustrating an example of the hardware configuration of the communication terminal 11. As illustrated in FIG. 2, the communication terminal 11 includes a central processing unit (CPU) 101, a read only memory (ROM) 102, a random access memory (RAM) 103, a storage unit 105, a media drive 107, an operation unit 108, a network interface (I/F) 111, an imaging element I/F 112, a voice input/output I/F 113, and a display I/F 114; the units are connected to each other by a bus 110.

The CPU 101 controls an operation of the communication terminal 11 by uncompressing a computer program 104 having been stored in the ROM 102 or the storage unit 105 to the RAM 103 and sequentially executing the computer program 104. The storage unit 105 is a hard disk drive (HDD) or a solid state drive (SSD) and stores data to be readable/writable. Specifically, the storage unit 105 stores the computer program 104 to be executed by the CPU 101 or the various setting information thereof. In the updating, the computer program 104 or the various setting information that is stored in the storage unit 105 is updated. In this embodiment, the computer program 104 is to be updated (target update) as described later.

The media drive 107 is a drive device that performs a read/write operation on a medium 106 such as an optical disk. The operation unit 108 is a keyboard, various operation keys, and a touch panel staked on a display 13 and receives an operation input by the user. The network I/F 111 is an interface that is connected to the communication network 2 and performs data communication. The imaging element I/F 112 is an interface that is connected to a camera 12 that is a digital camera and acquires an image captured by the camera 12. The voice input/output I/F 113 is an interface that is connected to a microphone 14 and a speaker 15 and performs a voice input by the microphone 14 or a voice output by the speaker 15. The display I/F 114 is an interface that is connected to the display 13 such as a liquid crystal display (LCD) and outputs display data to the display 13.

In this embodiment, the display 13 is used. However, instead of the display 13, another display apparatus such as a projector may be connected to configure the embodiment.

The communication terminal 11 outputs, under control of the CPU 101 executing the computer program 104, an image acquired by using the camera 12 or a voice input from the microphone 14 to the relay device 30 through the network I/F 111 during the calling with another communication terminal. The communication terminal 11 outputs, by the speaker 15, a voice that has been transmitted from another terminal, relayed by the relay device 30 and input through the network I/F 111, and displays an image from another communication terminal on the display 13. Thereby, the communication terminal 11 realizes a call with another communication terminal through images and voices, that is so-called a teleconference.

Figure 3:
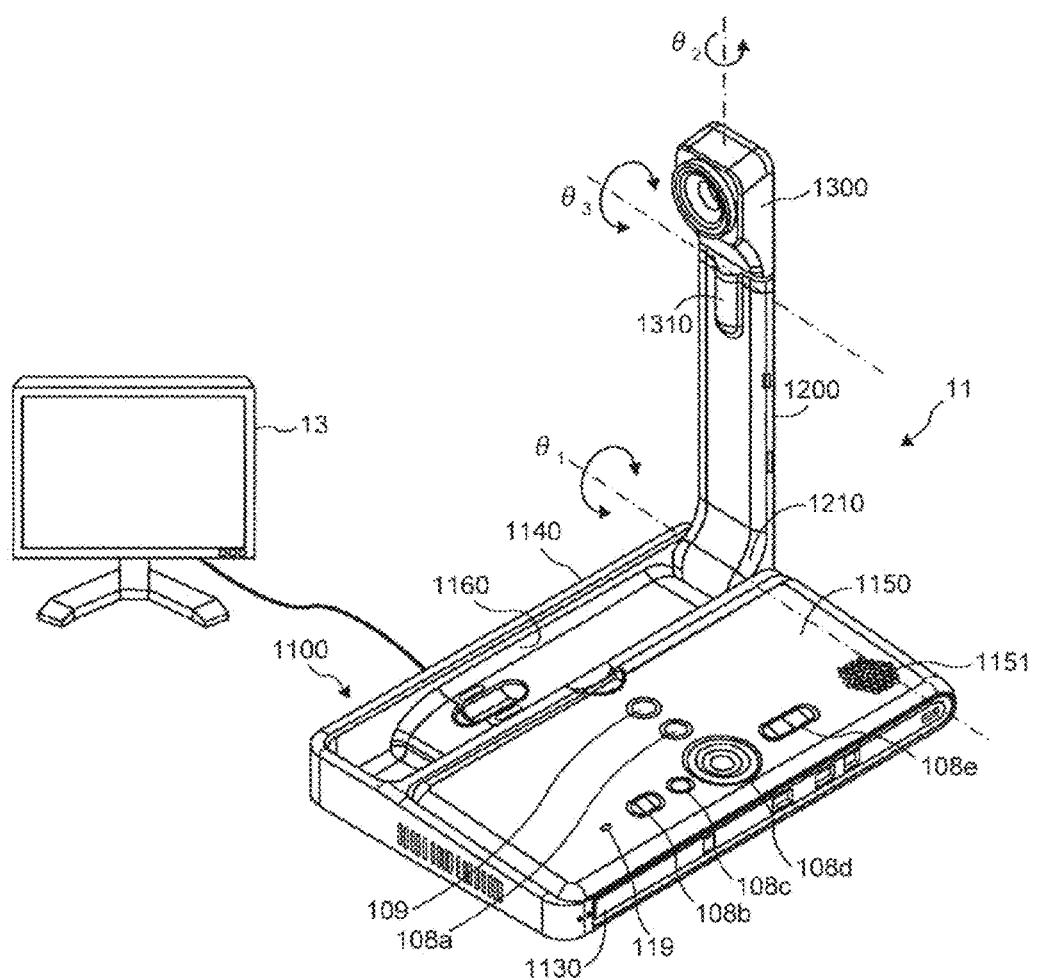
FIG. 3 is an exterior view illustrating a communication terminal according to the embodiment.

Subsequently, the exterior configuration of the communication terminal 11 will be explained. FIG. 3 is an exterior view illustrating a communication terminal 11 according to the present embodiment. As illustrated in FIG. 3, the communication terminal 11 includes a casing 1100, an arm 1200, and a camera housing 1300.

On a right wall surface 1130 of the casing 1100, an operation panel 1150 is formed. On the operation panel 1150, a plurality of operation buttons 108a to 108e functioning as the operation unit 108, a power switch 109, an alarm lamp 119, and a voice output surface 1151 to output a voice from an incorporated speaker are formed.

On a left wall surface 1140 of the casing 1100, a storage portion 1160 that functions as a concave portion to house the arm 1200 and the camera housing 1300 is formed. The casing 1100 of the communication terminal 11 is connected to the display 13 through a cable.

The arm 1200 is attached to the casing 1100 through a torque hinge 1210 so that the arm 1200 can rotate in an up-down direction, in a range of a tilt angle $\theta_1$, 135 degrees, with respect to the casing 1100. FIG. 3 illustrates a state in which the tilt angle $\theta_1$ is 90 degrees.

The camera 12 is incorporated in the camera housing 1300 and the camera can capture images of the user, a document, and a room. In the camera housing 1300, a torque hinge 1310 is formed. The camera housing 1300 is attached to the arm 1200 through the torque hinge 1310. The camera housing 1300 is configured such that the torque hinge 1310 is rotatable in horizontal and vertical directions, in the range of a panning angle $\theta_2$ within ±180 degrees with respect to the state illustrated in FIG. 3, which is a state at 0 degrees, and in the range of a tilt angle $\theta_3$ within ±45 degrees with respect to the arm 1200.

Figure 4:
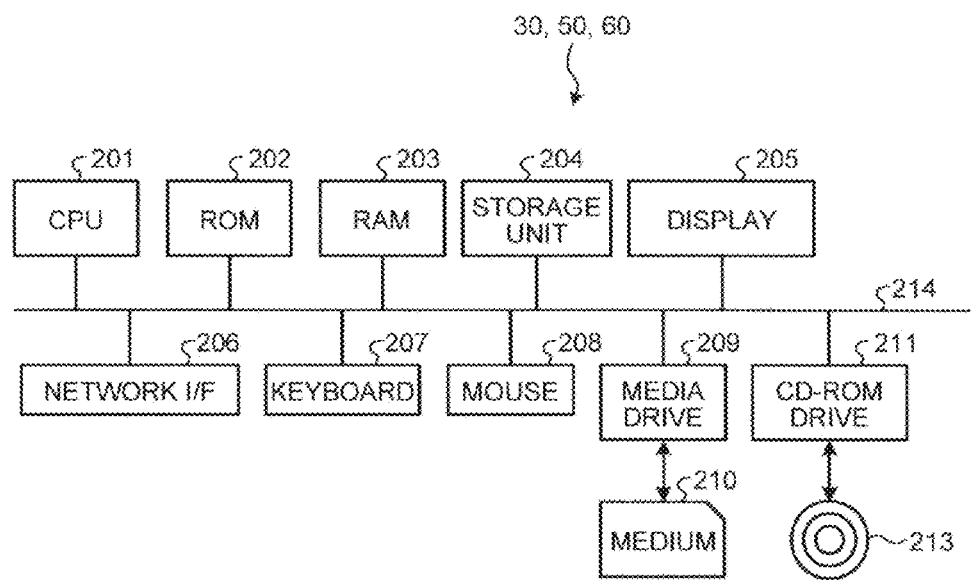
FIG. 4 is a block diagram illustrating an example of the hardware configuration of a relay device, a remote communication management server, and an update server according to the embodiment.

Next, the hardware configuration of the relay device 30, the remote communication management server 50, and the update server 60 will be described. FIG. 4 is a block diagram illustrating an example of the hardware configuration of the relay device 30, the remote communication management server 50, and the update server 60. As illustrated in FIG. 4, each of the relay device 30, the remote communication management server 50, and the update server 60 includes a CPU 201, a ROM 202, a RAM 203, a storage unit 204, a display 205, a network I/F 206, a keyboard 207, a mouse 208, a media drive 209, and a CD-ROM drive 211, and all the units are connected to each other by a bus 214. Each of the relay device 30, the remote communication management server 50, and the update server 60 is an apparatus, such as a personal computer (PC) or a workstation (WS).

The CPU 201 uncompresses a computer program stored in the ROM 202 or the storage unit 204 to the RAM 203, sequentially executes the computer program, and performs a central control of an operation of the self device. The storage unit 204 is an HDD or an SSD and stores data to be readable/writable. For example, in the update server 60, information that is related to an update is stored in the storage unit 204.

The display 205 is, for example, an LCD. The network I/F 206 is an interface that is connected to the communication network 2 and performs data communication. The keyboard 207 and the mouse 208 receive an operation input by the user. The media drive 209 is a drive device, such as an optical disk, to perform a read/write operation on a medium 210. The CD-ROM drive 211 is a drive device that performs a read operation on a CD-ROM 213. For example, in the update server 60, latest information that is related to an update is provided by the medium 210 or the CD-ROM 213 and is stored in the storage unit 204.

Figure 5:
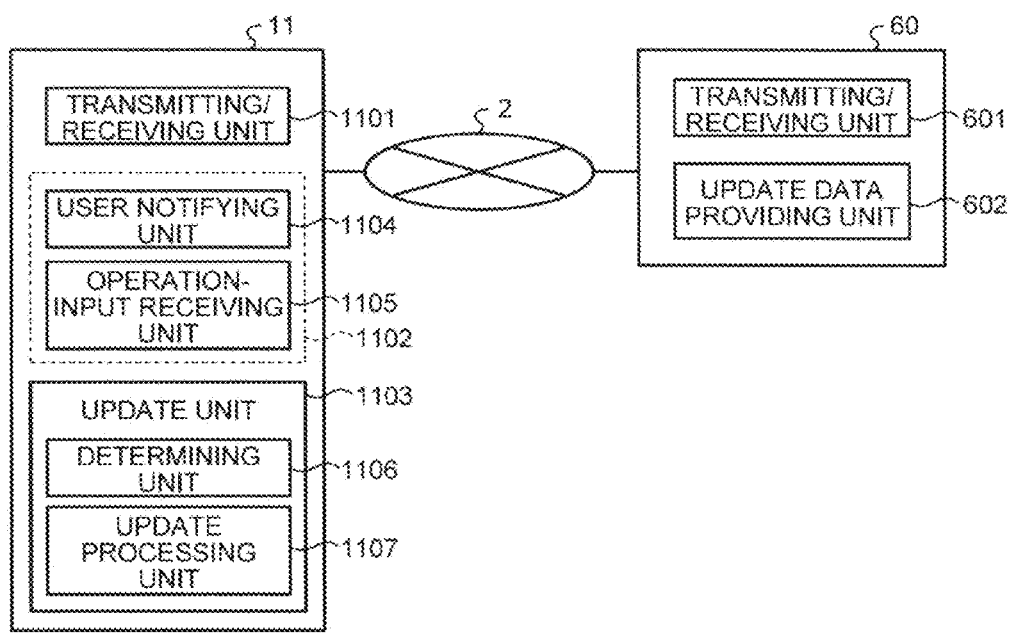
FIG. 5 is a block diagram illustrating an example of the functional configuration of a communication terminal and an update server according to the embodiment.

Next, the functional configuration of the communication terminal 11 and the update server 60 that is realized by executing a computer program by the CPU 101 or the CPU 201 will be described. FIG. 5 is a block diagram illustrating an example of the functional configuration of the communication terminal 11 and the update server 60 according to this embodiment.

First, the functional configuration of the communication terminal 11 will be explained. As illustrated in FIG. 5, the communication terminal 11 includes a transmitting/receiving unit 1101, a user interface unit 1102, and an update unit 1103 as main components.

The transmitting/receiving unit 1101 exchanges data with the update server 60 through the communication network 2. Specifically, the transmitting/receiving unit 1101 starts a communication session using a predetermined communication protocol, on the basis of the communication address of the update server 60 preset in the setting information of the storage unit 105 or the communication address of the update server 60 acquired by an inquiry to the remote communication management server 50, and exchanges data with the update server 60. By exchanging the data with the update server 60, the transmitting/receiving unit 1101 acquires information related to an update that is managed by the update server 60. In other words, the transmitting/receiving unit 1101 receives, from the update server 60, metadata representing the update required for the program 104 of the communication terminal 11.

The user interface unit 1102 is an interface that controls a voice output by the speaker 15, a display screen of the display 13, and an operation input from the user through the operation unit 108 and controls information transfer between the user and the communication terminal 11. Specifically, the user interface unit 1102 includes a user notifying unit 1104 that notifies the user of various types of information through the voice output by the speaker 15 and the display screen of the display 13 and an operation-input receiving unit 1105 that receives an operation input by the user through the operation unit 108.

The update unit 1103 executes update of the program 104 or various setting information stored in the storage unit 105, on the basis of the information related to an update acquired from the update server 60 by the transmitting/receiving unit 1101. The update unit 1103 includes a determining unit 1106 and an update process unit 1107.

The determining unit 1106 determines whether the latest version of target update is later than a terminal version (device version). In this case, the terminal version is a current version of the program 104 of the update target of the communication terminal 11. This terminal version is set in setting information of the storage unit 105. For example, when the OS (operating system) is Windows (registered trademark) of Microsoft (R) Corporation, the terminal version is set in a registry as setting information.

When the latest version is later than the terminal version, the determining unit 1106 makes a determination as follows. When the metadata indicate that the target update includes a specification of dependency version, which is a dependency version of update, the determining unit 1106 compares this dependency version and the terminal version to determine whether the dependency version is later than the terminal version.

The transmitting/receiving unit 1101 according to the present embodiment performs the following processing according to this determination result. When the dependency version is later than the terminal version, the transmitting/receiving unit 1101 requests the update server 60 to transmit metadata representing the update of the dependency version, and receives the metadata of the dependency version from the update server 60. When the dependency version is not later than the terminal version, the transmitting/receiving unit 1101 does not request the update server 60 to transmit metadata of the dependency version, and therefore, the transmitting/receiving unit 1101 does not receive the metadata.

The update process unit 1107 executes the update of the dependency version on the basis of the metadata of the update program of the dependency version, and after the update of the dependency version is executed, the update process unit 1107 executes the update of the update program of the update target, on the basis of the metadata of the update program of the update target. After the update program of the update target is executed, the update process unit 1107 updates the terminal version to the latest version and sets the terminal version. The update process unit 1107 also receives data files from a storage location specified in the metadata, and executes the update. In this case, when the data files are provided as a cabinet file including multiple pieces of data or a file in a packaged format such as ZIP format (packaged file), the update process unit 1107 performs the update process by executing a script included in the packaged file. In this case, the script includes data in an executable format describing a procedure of execution of the update.

Subsequently, the functional configuration of the update server 60 will be explained. As illustrated in FIG. 5, the update server 60 includes a transmitting/receiving unit 601 and an update data providing unit 602 as main components.

The transmitting/receiving unit 601 exchanges data with the communication terminal 11 through the communication network 2. Specifically, the transmitting/receiving unit 601 starts a communication session using a predetermined communication protocol in response to a request from the communication terminal 11 through the communication network 2 and exchanges the data with the communication terminal 11.

The update data providing unit 602 provides information related to an update managed by the update server 60 to the communication terminal 11 in response to a request from the communication terminal 11 transmitting/receiving data by the transmitting/receiving unit 601.

Now, the metadata will be explained in detail. FIG. 6 is a conceptual diagram illustrating an example of metadata. As illustrated in FIG. 6, the metadata of each version is configured to include data items such as "version", "description", "package_url", "package_digest", "execute", "reboot", "critical", "dependency", "dependency_version", and "dependency_metadata_url".

The "version" is set to the version number of the update program such as "1.0.1". The "dependency" is a flag indicating whether there is a dependency version, which is another version having dependency relationship. When there is a dependency version, the "dependency" is set to "true", and when there is no dependency version, the "dependency" is set to "false". When there is a dependency version, the "dependency_version" is set to a version number representing the another version having dependency relationship with each other, i.e., the version number of the dependency version. Therefore, it is possible to follow the dependency version by checking the version number described in the data item of the "dependency_version". The "dependency_metadata_url" is set to the URL of the storage location of the metadata of the dependency version.

The "description" is set to the detailed description about the version such as "It is sample data.". The "package_url" is set to the URL of the storage location of the program (data file), which is the entity of the update managed by the update server 60. The "package_digest" is set to a checksum of the data file, which is the entity of the update. Therefore, the update process unit 1107 uses the transmitting/receiving unit 1101 to obtain the data file, on the basis of the contents described in the data item of the "package_url", thus capable of executing the update concerning the version described in the metadata.

The "execute" is set to a script name of a script executed when the update is executed. This script is included in this packaged file when the obtained data file is a packaged file in a packaged format. The "reboot" is a flag indicating whether the communication terminal 11 is rebooted or not after the update is executed. When the communication terminal 11 is rebooted, the "reboot" is set to "true", and when the communication terminal 11 is not rebooted, the "reboot" is set to "false". The "critical" is a flag indicating whether the update is the forced update or not. When the update is the forced update, the "critical" is set to "true", and the update is the normal update, the "critical" is set to "false".

Updates of the program 104 of the storage unit 105 include those concerning device control such as the network I/F 111, the imaging element I/F 112, the voice input/output I/F 113, and the display I/F 114. The update of such device control requires rebooting after the update, and therefore, the "reboot" is set to "true". As described above, the update of the program includes the normal update and the forced update. When the forced update is performed, the "reboot" is set to "true".

Figure 7:
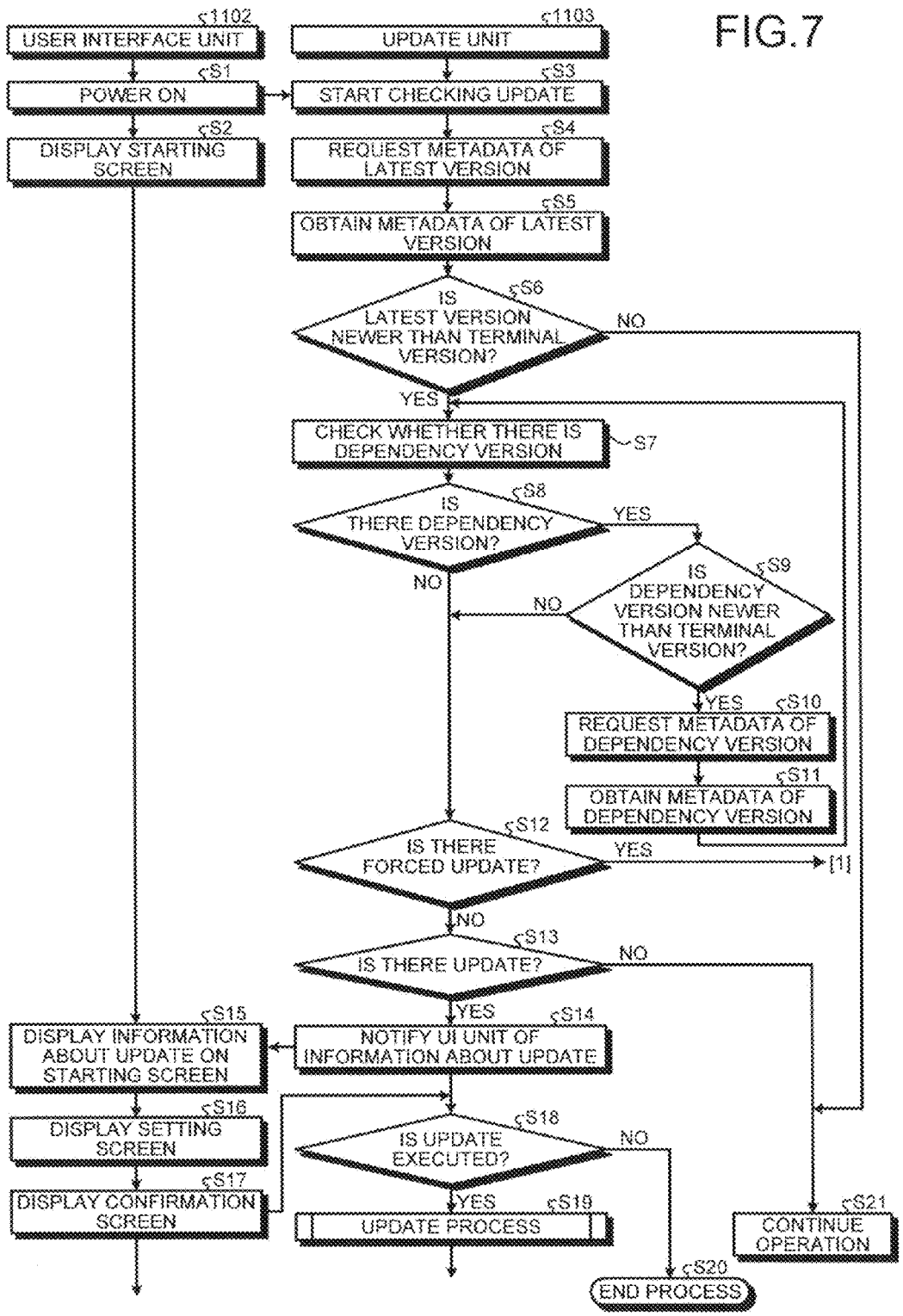
FIG. 7 is a ladder chart illustrating an example of an operation of the communication terminal according to the embodiment.
Figure 8:
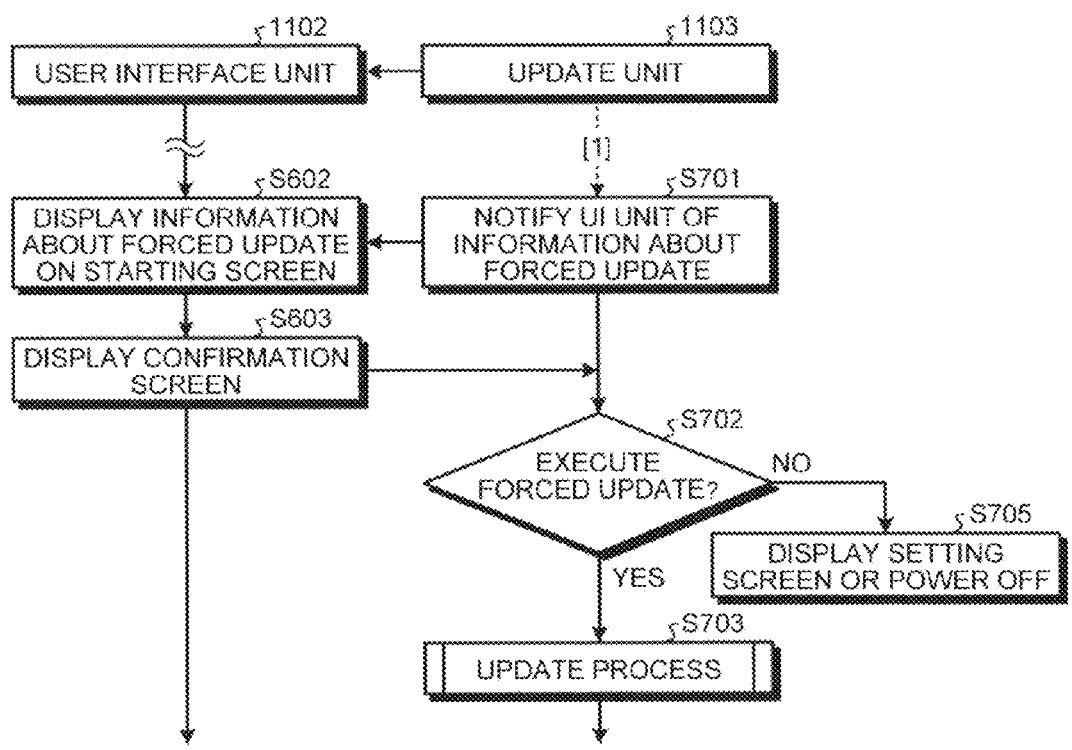
FIG. 8 is a ladder chart illustrating an example of an operation of the communication terminal according to the embodiment.

Subsequently, the details of operation of the communication terminal 11 configured as described above will be explained. FIGS. 7 and 8 are ladder charts illustrating an example of an operation of the communication terminal 11 according to the present embodiment.

As illustrated in FIG. 7, the user interface unit 1102 turns on a power supply of the self device (step S1) according to an operation of a power switch, or the like, of the operation unit 108 and displays a starting screen on the display 13 (step S2). The starting screen is a display screen that displays a list of call statuses of all the communication terminals 11 that are obtained by an inquiry to the remote communication management server 50 under control of the CPU 101 (which will be described in detail below).

At the startup after the power-on in step S1, the update process unit 1107 starts checking update of the self device (step S3). In the explanation below, for example, update of program is explained as an example. However, it is to be understood that update of various setting information may also be performed in the same manner.

After the check of update is started, the update process unit 1107 uses the transmitting/receiving unit 1101 to request the update server 60 to transmit the metadata of the program of the latest version (step S4), and in response to the request, the update process unit 1107 obtains the metadata provided by the update data providing unit 602 of the update server 60 (step S5).

Subsequently, the determining unit 1106 obtains the terminal version from the setting information stored in the storage unit 105, and determines whether the latest version is later than the terminal version of the communication terminal 11 (step S6).

Then, when the latest version is not later than the terminal version (step S6: No), i.e., when the latest version is equal to the terminal version or the latest version is older than the terminal version, operation is continued without performing the update process (step S21).

On the other hand, when the latest version is newer than the terminal version in step S6 (step S6: Yes), the update process unit 1107 checks whether there is any dependency version or not, on the basis of the content described in the data item "dependency" in the obtained metadata (step S7). For example, as illustrated in FIG. 6, when the data item "dependency" is "true", and the data item "dependency_version" includes a version number representing another version such as "1.0.0", it is determined that there is a dependency version. Alternatively, when the date item "dependency" is "false", it is determined that there is no dependency version.

Subsequently, the determining unit 1106 determines whether there is a dependency version or not as a result of the check in step S7 (step S8). When there is a dependency version (step S8: Yes), the determining unit 1106 determines whether the version number set in the data item "dependency_version" of the metadata is more than the terminal version, thereby determining whether the dependency version is newer than the terminal version (step S9). Then, when the dependency version is newer than the terminal version (step S9: Yes), the update process unit 1107 uses the transmitting/receiving unit 1101 to request the update server 60 to transmit the metadata of the program of the dependency version, on the basis of the storage location set in the data item "dependency_metadata_url" of the metadata already obtained (step S10), and in response to the request, the update process unit 1107 obtains the metadata of the dependency version provided by the update data providing unit 602 (step S11), and then, returns back to step S7. Therefore, only when the dependency version is newer than the terminal version, the update process unit 1107 follows the versions depending on the latest version in order, and obtains the metadata concerning these versions.

When it is determined that there is no dependency version in step S8 (step S8: No), or it is determined that the dependency version is not newer than the terminal version in step S9 (step S9: No) although it is determined that there is a dependency version in step S8 (step S8: Yes), the update process unit 1107 determines whether the "critical" in the obtained metadata is set to "true" or not, thus determining whether the current update is the forced update or not (step S12).

Then, when the "critical" of the metadata is not set to "true", and the update is the normal update (step S12: No), the update process unit 1107 compares the version number described in the version of the metadata of the latest version with the terminal version of the self device (the version number of the program 104 stored in the storage unit 105), thereby determining whether there is an update for the self device (in other words, whether the update is completed or not) (step S13). More specifically, when the version number of the latest version is the same as the terminal version, the program 104 is the latest version, and therefore, it is determined that there is no update required for the self device (in other words, the update has been completed). On the other hand, when the version number of the latest version is not the same as the version number of the program 104, the program 104 is an old version, and therefore, it is determined that there is an update required by the self device (in other words, the update has not yet been completed). When there is no update required for the self device (step S13: No), it is not necessary to execute the update, and therefore, normal operation is continued (step S21).

When there is an update for the self device (step S13: YES), the update process unit 1107 notifies the user interface unit 1102 of the information about the update (step S14). More specifically, in the metadata of the latest version and the versions depending on the latest version, data item other than data items which are not required to be notified to the user such as "package_url" and "execute" are notified to the user interface unit 1102 as the information about the update.

The user notifying unit 1104 of the user interface unit 1102 displays a starting screen of the display 13 to indicate that there is an update required for the self device to notify the user to that effect, on the basis of the information about the update notified by the update process unit 1107 in step S14 (step S15).

Figure 9:
FIG. 9 is a conceptual diagram illustrating an example of a starting screen according to the embodiment.

The details of the starting screen will be explained. FIG. 9 is a conceptual diagram illustrating an example of a starting screen G1. As illustrated in FIG. 9, the starting screen G1 includes a main screen G11 that displays a list of call statuses of the communication terminals and a status screen G12 that displays a status of the self device. When the information related to the update is notified by the update process unit 1107, the user notifying unit 1104 displays on the status screen G12 a message indicating that there is an update available, and notifies the user of the message. The display of the message is not limited to the layout illustrated in the drawings and a predetermined icon image may be displayed on the main screen G11 to notify that there is an update available. In the examples of the screens that are illustrated in the drawings (FIGS. 9 to 13, and the like), portions that are displayed by white squares or black squares indicate areas where a message may be displayed, and are, for example, message display areas that are reserved on a system.

When an operation instruction to perform various setting such as an update is received by the operation-input receiving unit 1105 of the user interface unit 1102 according to the notification to the user at step S15, the user interface unit 1102 displays a setting screen on the display 13 (step S16).

Figure 10:
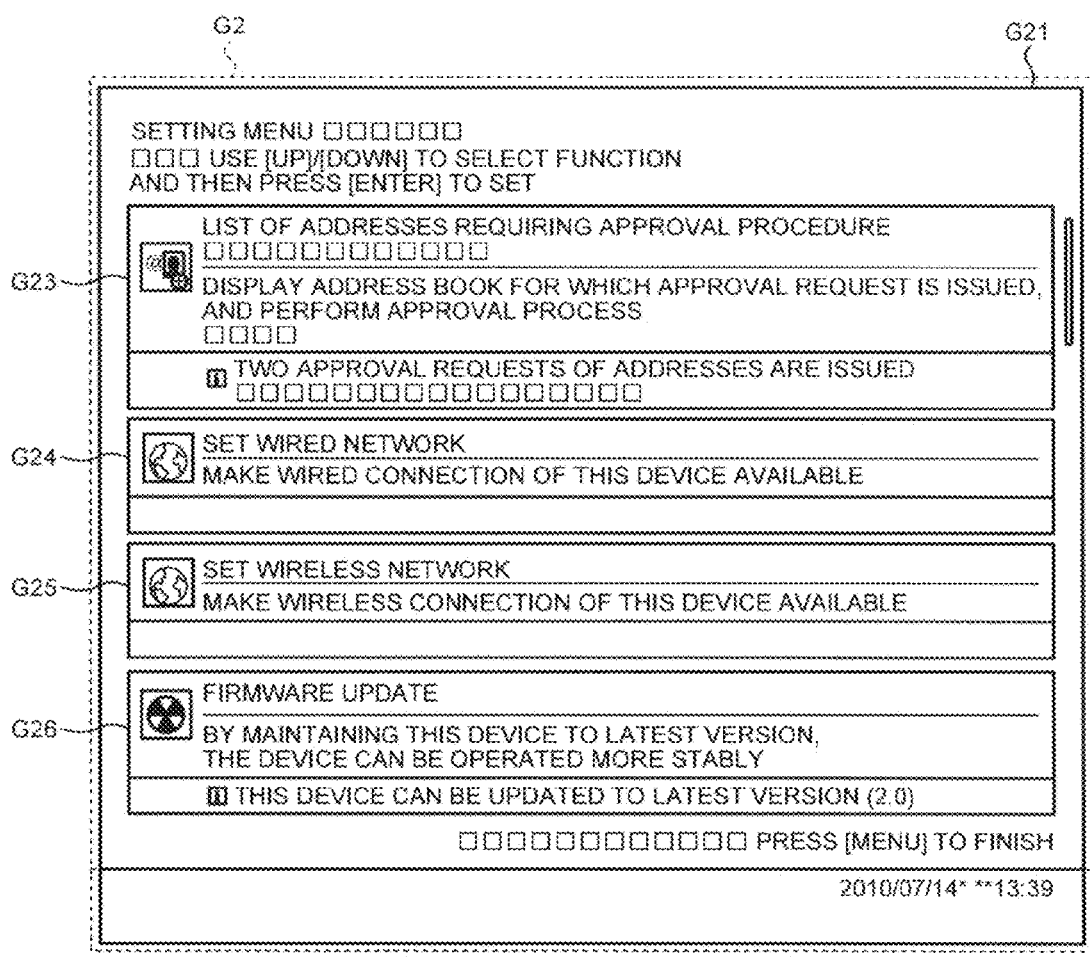
FIG. 10 is a conceptual diagram illustrating an example of a setting screen according to the embodiment.

FIG. 10 is a conceptual diagram illustrating an example of the setting screen G2. As illustrated in FIG. 10, the setting screen G2 includes a main screen G21 that displays setting buttons G23 to G26 to perform various settings upon receiving the selection operation by the user through the operation-input receiving unit 1105. The setting button G26 among the setting buttons G23 to G26 is a button to instruct to execute an update. If the information related to the update is not notified by the update process unit 1107 and there is no update available for the self device, the setting button G26 will be grayed out to invalidate the selection operation. In contrast, if the information related to the update is notified by the update process unit 1107 and there is an update available for the self device, the gray-out is cancelled and the selection operation by the user is received through the operation-input receiving unit 1105. In this case, in the setting button G26, a version number of the latest version for which the update is executed may be written, on the basis of the description of the data item "version" included as the information related to the update. In the example illustrated in the drawings, an update with the latest version having the version number of 2.0 is described. On the setting screen G2, a status screen to display a status of the self device may be displayed.

When the selection operation of the setting button G26 is executed at step S16, the user interface unit 1102 displays a confirmation screen to confirm execution of the update on the display 13 (step S17).

Figure 11:
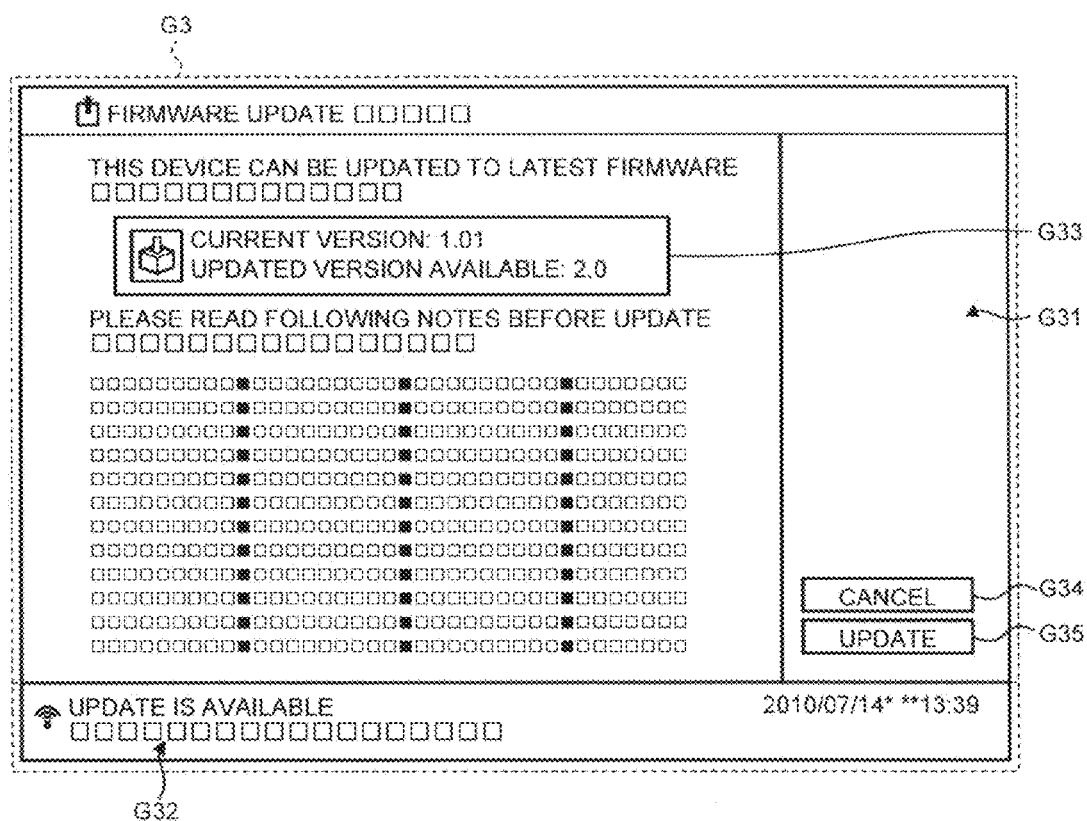
FIG. 11 is a conceptual diagram illustrating an example of a confirmation screen according to the embodiment.

FIG. 11 is a conceptual diagram illustrating an example of the confirmation screen G3. As illustrated in FIG. 11, the confirmation screen G3 includes a main screen G31 that includes an update display G33 displaying contents of an executed update and operation buttons G34 and G35 to receive instructions of cancellation of the update and execution of the update according to the contents, respectively, from the user and a status screen G32 displaying a status of the self device. Information on the current version number, that is the version number of the program 104 of the self device, the version number of the latest version where the update is to be executed on the basis of the description of the data item "version" included as the information related to the update, and the like is displayed on the update display G33 and is notified to the user. Therefore, the user can confirm, based on the contents displayed on the update display G33, the number of the version on which the updating is executed. It may be configured such that, by looking up the date item "reboot" of the metadata, information as to whether the reboot is to be performed may be displayed on the update display G33 of the confirmation screen G3.

Figure 12:
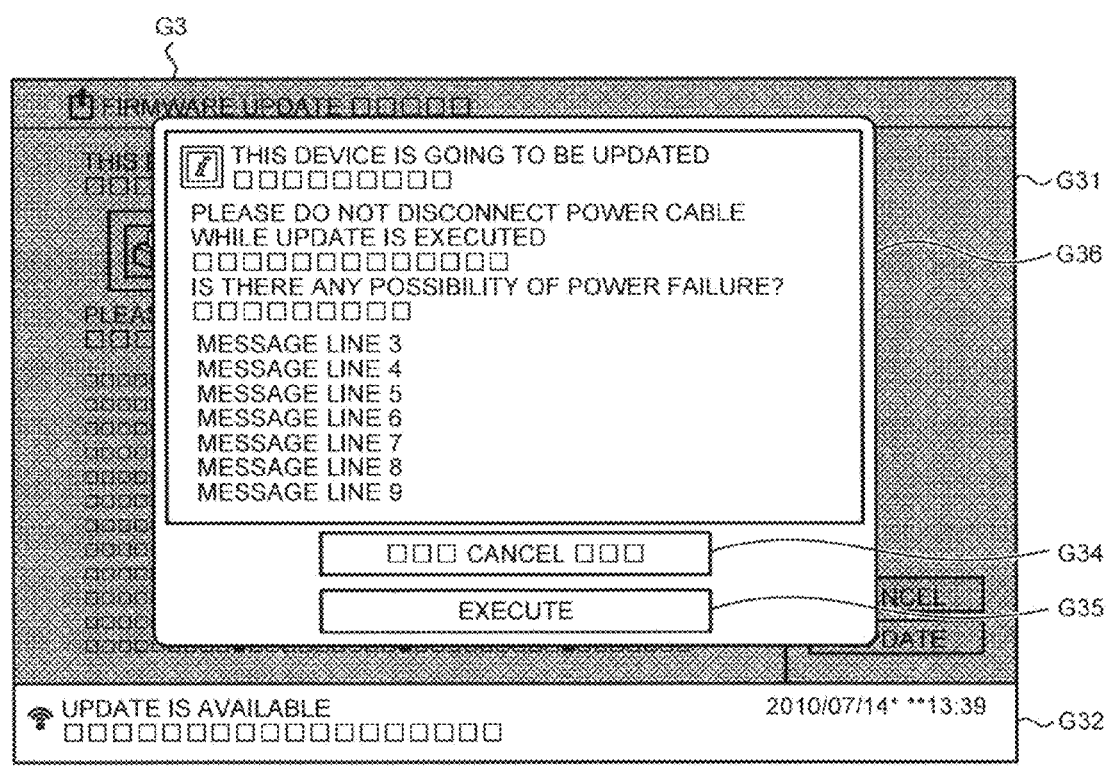
FIG. 12 is a conceptual diagram illustrating an example of a confirmation window according to the embodiment.

FIG. 12 is a conceptual diagram illustrating an example of a confirmation window G36. In the confirmation screen G3, when the operation button G35 to instruct the execution of the update is selected, the confirmation window G36 that urges the user to confirm the update may be displayed. On the confirmation window G36, information on the version number of the latest version on which the update is executed and important notes that require attention at the time of the predetermined update are displayed. In the confirmation screen G3, when the execution of the update is instructed, the confirmation window G36 may be displayed to call the attention of the user. It may be configured such that, by looking up the data item "reboot" of the metadata, information as to whether the reboot is to be performed may be displayed on the confirmation window G36.

Returning to FIG. 7, the update process unit 1107 determines whether the update is to be executed on the basis of the selection operation of the operation buttons G34 and G35 in the confirmation screen G3 (step S18). When the operation button G35 to instruct the execution of the update is selected (step S18: Yes), the update process unit 1107 executes an update process on the basis of the acquired metadata (step S19). The details of the update process will be explained later.

When the operation button G34 to cancel the execution of the update is selected and the selection of the operation button G35 is not performed (step S18: No), the update process unit 1107 performs an end process to terminate the processes of the self device (step S20) and turns off the power supply to the device.

That is, in the communication terminal 11, if there is an update available for the self device, the availability of the update is notified to the user by the user notifying unit 1104 of the user interface unit 1102. The communication terminal 11 receives a selection operation as to whether the update is to be executed from the user using the operation-input receiving unit 1105. When the selection operation to execute the update is performed, an update process is executed by the update process unit 1107. Therefore, the user can select execution of the update of the communication terminal 11 when there is the update which is to be executed in the self device.

When it is determined that the "critical" of the metadata is set to "true" in step S12, i.e., when the update is the forced update (step S12: Yes), the update process unit 1107 notifies the user interface unit 1102 of information about the forced update (step S701). More specifically, like the normal update, in the metadata of the latest version and the versions depending on the latest version, data item other than data items which are not required to be notified to the user such as "package_url" and "execute" are notified to the user interface unit 1102 as the information about the update.

The user notifying unit 1104 of the user interface unit 1102 displays on the starting screen G1 of the display 13 a message indicating that there is the forced update required for the self device (see FIG. 9), on the basis of the information about the forced update notified by the update process unit 1107 in step S701, and notifies the user to that effect (step S602).

More specifically, the user notifying unit 1104 may display, on the status screen G12 of the starting screen G1, the information indicating that the update is the forced update, and may gray out the list displayed on the main screen G11 to notify the user that an operation other than the update is invalid.

When the user is notified in step S701, the user interface unit 1102 displays a confirmation screen G70 for confirming execution of the update (see FIG. 13) on the display 13 (step S603). It should be noted that the setting screen G2 (see FIG. 10) of the update, which is used during the normal update, is not displayed.

Figure 13:
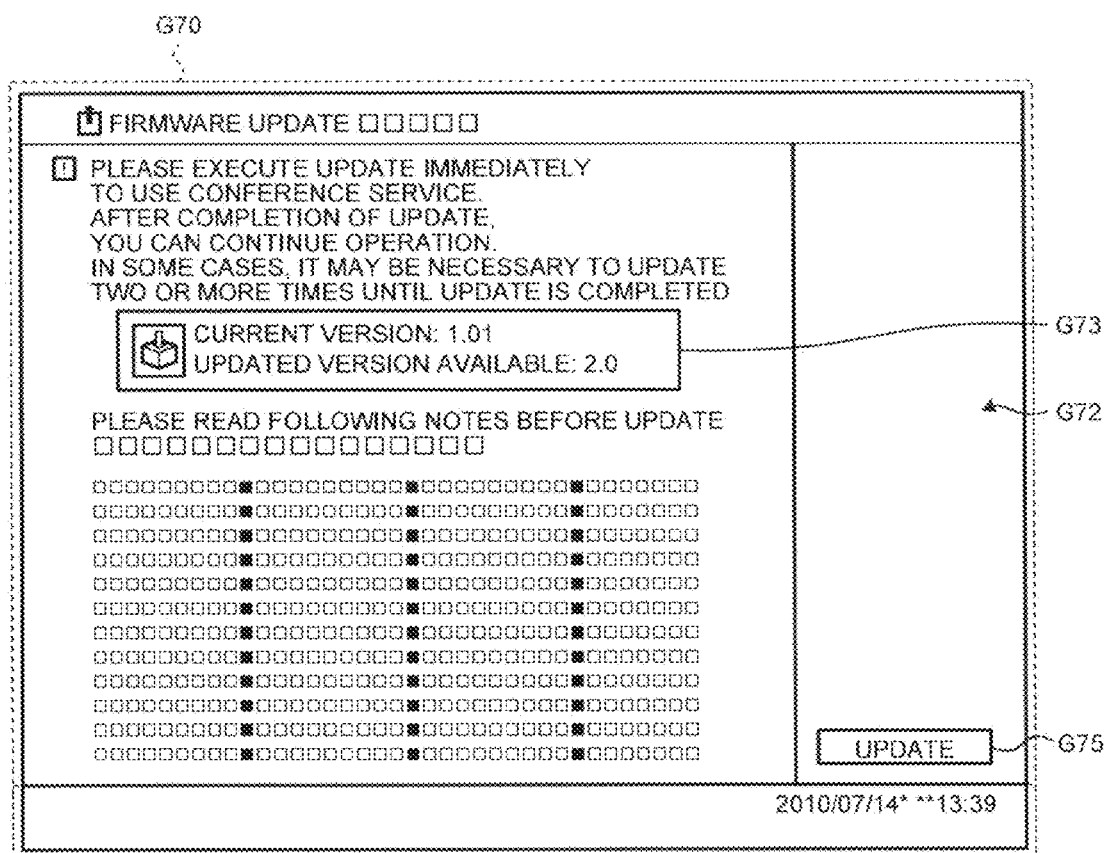
FIG. 13 is a conceptual diagram illustrating an example of a confirmation screen during a forced update according to the embodiment.

FIG. 13 is a conceptual diagram illustrating an example of the confirmation screen G70 which is displayed during the forced update. As illustrated in FIG. 13, the confirmation screen G70 includes a main screen G72 that includes an update display G73 to display contents of the executed update and an operation button G75 to receive an execution command of the update from the user. On the update display G73, the following information is displayed: information on the current version number, which is the version number of the program 104 of the self device, and information on the version number of the latest version on which the forced update is performed according to the description of the data item "version" included as the information related to the forced update, so that the information is notified to the user. Therefore, the user can confirm the number of the version to be updated, according to the displayed contents of the update display G73.

In this case, only the update button G75 is displayed as a button displayed on the confirmation screen G70 of the forced update and the cancellation button G34 that is displayed on the confirmation screen G3 (FIG. 11) of the normal update is not displayed. This is because the update always needs to be executed in the case of the forced update. However, a screen may be changed to a setting screen by the operation button corresponding to the menu key of the operation unit 108 or the power supply may be turned off by pressing the power switch 109.

Returning to FIG. 8, the update process unit 1107 determines whether the forced update is to be executed on the basis of the selection operation of the operation button G75 in the confirmation screen G70 (step S702). When the operation button G75 to instruct the execution of the forced update is selected (step S702: YES), the update process unit 1107 executes an update process on the basis of the acquired metadata (step S703).

Meanwhile, at step S702, when the operation button G75 is not pressed and the operation button of the operation unit 108 is pressed (step S702: No), display of the setting screen or power shutdown is performed according to the pressed operation button (step S705).

Figure 14:
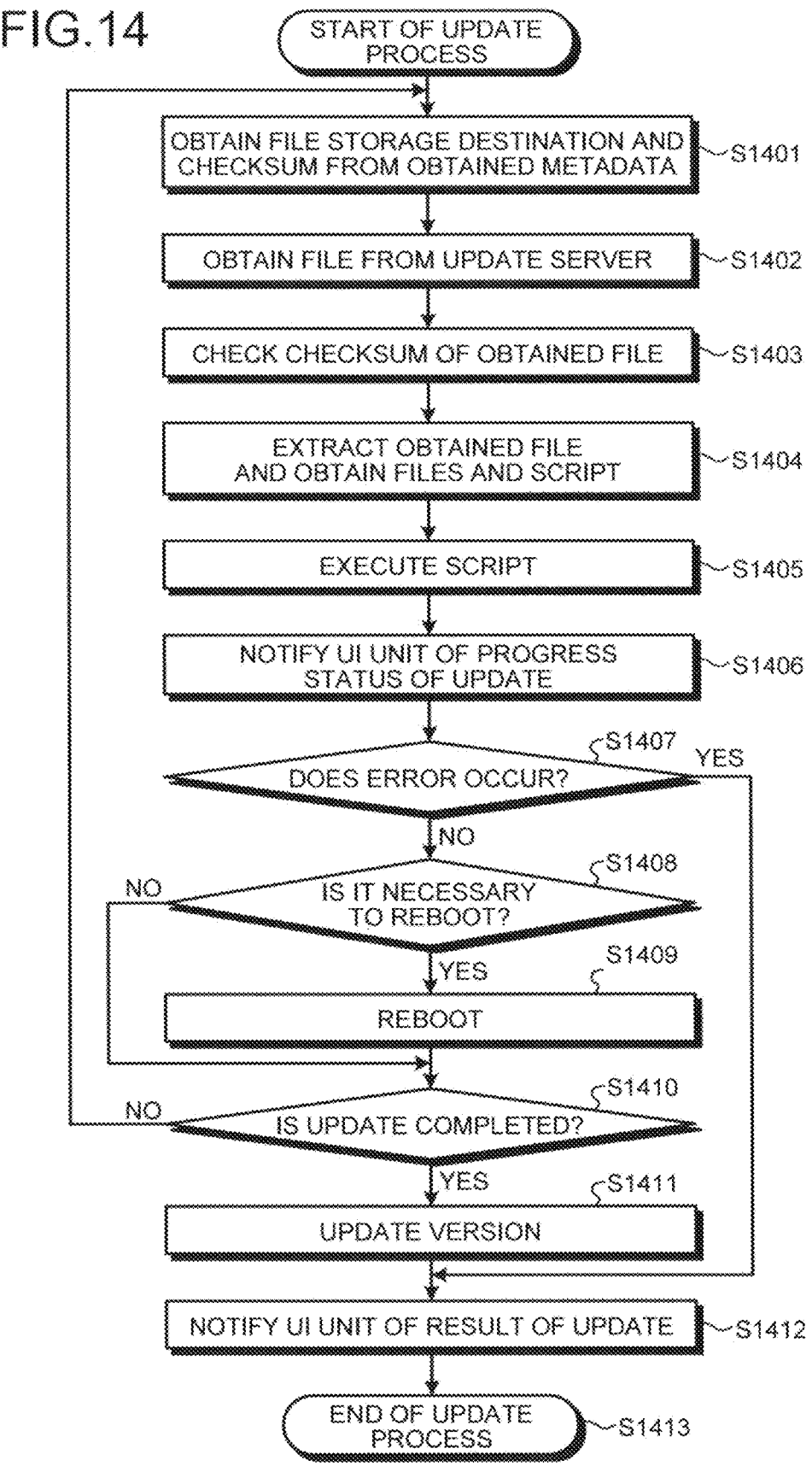
FIG. 14 is a flowchart illustrating an example of an update process according to the embodiment.

Subsequently, the update process (steps S19, S703) will be described in detail. FIG. 14 is a flowchart illustrating an example of a sequence of the update process. It should be noted that the same update process as illustrated in FIG. 14 is executed in steps S19 and S703.

As illustrated in FIG. 14, if the update process starts (step S100), the update process unit 1107 stops a function of an interface unit such as the imaging element I/F 112, the voice input/output I/F 113, and the like for connecting to external devices such as the camera 12, the microphone 14, and the speaker 15. If the interface unit is operated, because the program 104 related to the interface unit is being used, an error may occur in an update. In order to prevent the error from occurring in advance, the update process unit 1107 stops the function of the interface unit in conjunction with the start of the update process.

Subsequently, the update process unit 1107 obtains the storage location of the data file, which is the entity of the update, from the "package_url" of the obtained metadata, and obtains the checksum from the "package_digest" (step S1401). When the metadata of multiple versions having dependency relationship have been obtained, the processes from S1401 to S1410 are performed in the ascending order of the version number.

Subsequently, the update process unit 1107 obtains the data file obtained in step S1401 from the update server 60 (step S1402). When the data file is provided as a packaged file in a packaged format including multiple files such as a cabinet file or a ZIP file, the retrieval can be completed at a time even though there are multiple data files (programs), so that the use of the network bandwidth can be reduced.

Subsequently, the update process unit 1107 checks the checksum of the data file obtained in step S1402 (step S1403). Then, when the obtained data file is packaged file including multiple files, the update process unit 1107 extracted the obtained packaged file to obtain files for update and a script (step S1404). In this script, the procedure of operation concerning the update such as move and delete of files is described.

FIG. 15 is an explanatory diagram illustrating an example of a script. In FIG. 15, commands such as creation a directory, moving of a file, processing termination, and rebooting are described based on the "Device Update Script" of Microsoft (R) Corporation. As illustrated in FIG. 15, the script for update may be distributed in a text format that can be read by a human, or may be distributed upon being compiled into a machine language format, an intermediate language format, and the like, for the purpose of reducing the processing time.

Subsequently, the update process unit 1107 executes the script obtained in step S1404, and carries out the update (step S1405). Subsequently, the update process unit 1107 notifies the user interface unit 1102 of the progress status of the update (step S1406). In this notification of the progress status, a notification as to whether the processing of S1402, S1403, S1404, and S1405 has been terminated or not is notified. When multiple versions having dependency relationship (dependency versions) are updated, it may be possible to notify which version of update has been completed. The user interface unit 1102 displays the notified progress status of the update on the screen of the display 13, thus notifying the user.

Figure 16:
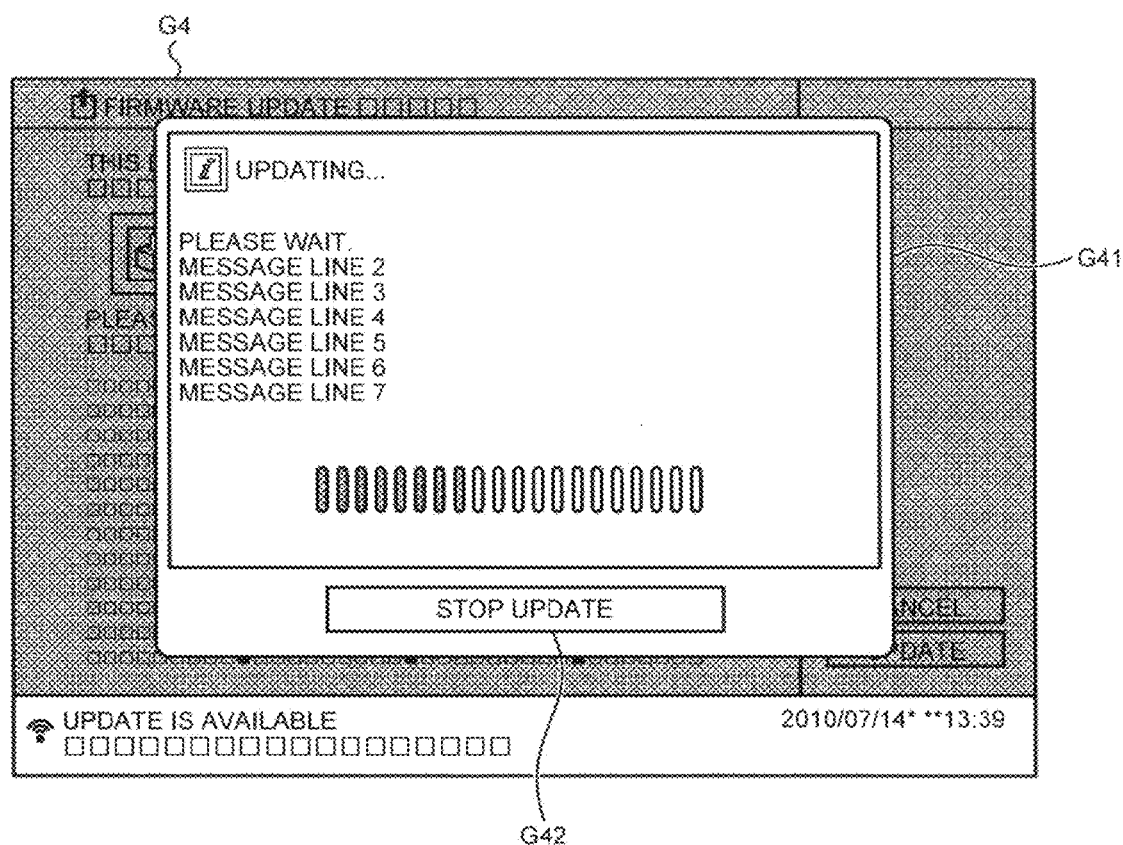
FIG. 16 is a conceptual diagram illustrating an example of an update screen according to the embodiment.

FIG. 16 is a conceptual diagram illustrating an example of an update screen G4. As illustrated in FIG. 16, the update screen G4 is a screen that is displayed on the display 13 by the user interface unit 1102 during the update process performed by the update process unit 1107. On the update screen G4, an update status window G41 to display the progress status of the update notified by the update process unit 1107 and an operation button G42 for instructing to stop the update are displayed. The user can confirm the progress status of the update from the displayed contents of the update status window G41.

In addition, remaining time for the update or a current line speed may be displayed in real time on the update screen G4. In this case, the user can clearly grasp the details of the progress status of the update.

Subsequently, the update process unit 1107 determines whether there occurs an error or not (step S1407). When the error occurs (step S1407: Yes), the loop of steps S1401 to S1410 is broken, and then the process in step S1412 is performed. In step S1407, in addition to the error (for example, difference of the checksum at step S1403) that occurs due to some factor during the execution of the update, it is determined that an error occurs.

When the error does not occur in step S1407 (step S1407: No), the update process unit 1107 determines whether the "reboot" included in the metadata is set to "true" to determine whether rebooting is required or not (step S1408).

In this case, in the present embodiment, the "reboot" in the metadata indicates whether it is necessary to reboot or not before a subsequent update is performed after the update carried out. In the update process as shown in FIG. 14, the update is performed in the processing from steps S1401 to S1410, and when multiple versions are updated, the processing from steps S1401 to S1410 is repeated for the same number of times as the number of versions to be updated. Therefore, in the present embodiment, in the final loop of steps S1401 to S1410, a determination is made as to whether the "reboot" included in the metadata is set to "true" or not, and a determination is made as to whether it is necessary to reboot or not (step S1408), so that the communication terminal 11 is rebooted on each update.

Then, when the "reboot" is set to "true", and it is necessary to reboot the communication terminal 11 (step S1408: Yes), the communication terminal 11 is rebooted (step S1409).

Then, the update process unit 1107 determines whether all the versions have been updated or not (step S1410). When all the versions have not yet been updated (step S1410: No), step S1401 is performed again, so that the update process is continued. When all the versions have been updated (step S1410: Yes), the update process unit 1107 updates the terminal version of the program 104, which is set in the setting information of the storage unit 105 of the communication terminal 11, to the latest version with which the communication terminal 11 is updated (step S1411). When the OS is Windows (registered trademark) of Microsoft (R) Corporation, the update process unit 1107 updates the terminal version of the program 104 set in the registry to the latest version.

Subsequently, the update process unit 1107 notifies the user interface unit 1102 of the results of the update made in steps S1401 to S1410 (step S1412). The user interface unit 1102 displays the notified results of the update on the screen of the display 13 to notify the user of the results of the update.

Figure 17:
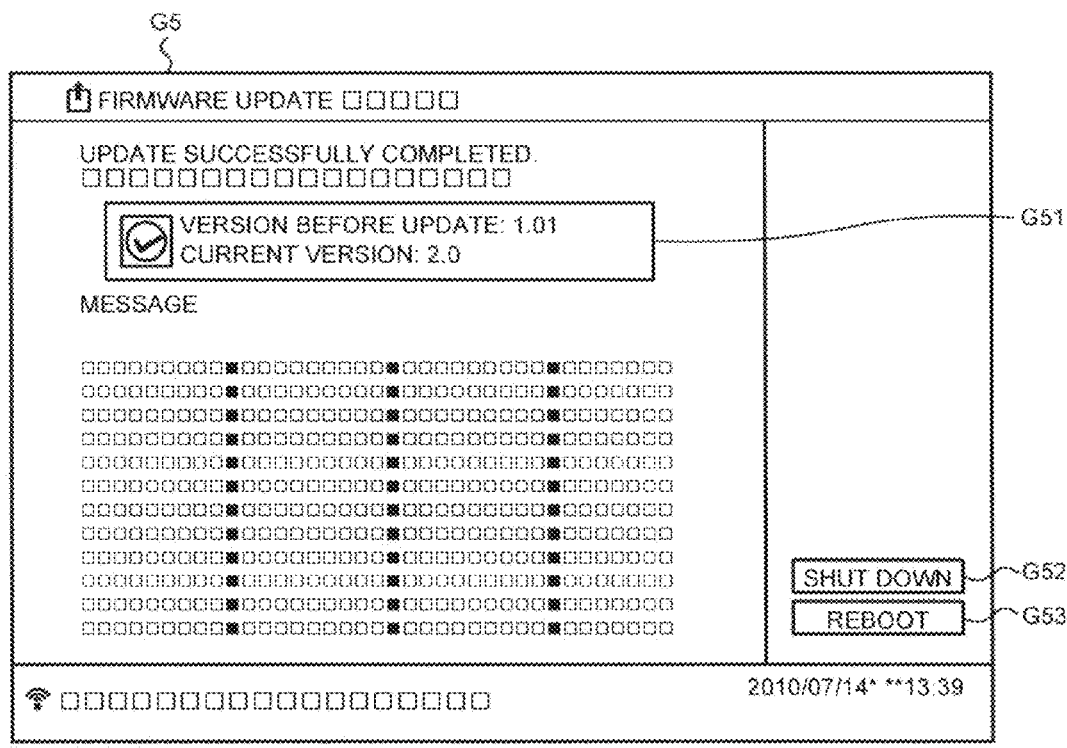
FIG. 17 is a conceptual diagram illustrating an example of a confirmation screen in a case of a normal update according to the embodiment.

As the result of the normal update, a confirmation screen G5 of FIG. 17 is displayed. On the other hand, as the result of the forced update, a forced update result screen G80 as illustrated in FIG. 18 is displayed.

FIG. 17 is a conceptual diagram illustrating an example of the confirmation screen G5 for the normal update. As illustrated in FIG. 17, upon receiving the results of the update, the user interface unit 1102 displays, on the confirmation screen G5, the results of the update G51 in S1401 to S1410 or the operation buttons G52 and G53 to receive an operation for a shutdown after the update and the reboot, respectively. In the results of the update G51, information related to the version before the update and information related to a current version by the update in steps S1401 to S1410 are displayed. The user can confirm the result of the update from the displayed contents of the results of the update G51.

Figure 18:
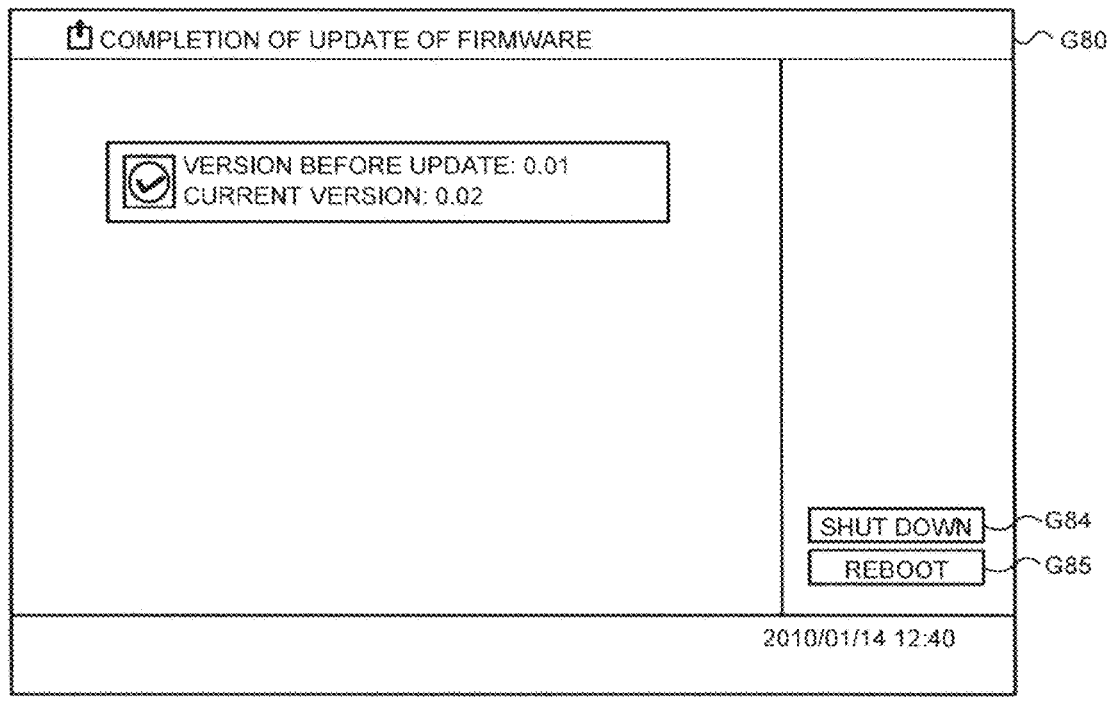
FIG. 18 is a conceptual diagram illustrating an example of a forced update result screen according to the embodiment.

FIG. 18 is a conceptual diagram illustrating an example of the forced update result screen G80. Like the confirmation screen G5 for the normal update, a power shutdown button G84 and a rebooting button G85 are displayed on the forced update result screen G80, and the user can press any of the power shutdown button G84 and the rebooting button G85.

If the update process unit 1107 notifies the user interface unit 1102 of the update result, the update process unit 1107 terminates the update process (step S1413).

As described above, in the present embodiment, when there is an update of a version dependent upon an update, a determination is made as to whether this dependency version is newer than the terminal version, which is the current version of the program 104 of the communication terminal 11. When the dependency version is newer than the terminal version, the update server 60 is requested to transmit the metadata of the update of the dependency version via the network, and the metadata are obtained. In addition, the data file of the update of the dependency version is obtained from the update server 60 via the network. On the other hand, when the dependency version is equal to the terminal version or older than the terminal version, the metadata of the update of the dependency version are not requested, and therefore, the update of the dependency version is not obtained.

Therefore, according to the present embodiment, no matter whether the update of the program 104 includes an update of one dependency version or updates of multiple dependency versions, there is an advantage in that the use of the network bandwidth is reduced, and the network load is reduced, according to the terminal version, and moreover, the update process can be easily performed in a short time.

In the present embodiment, when there is an update executed by the communication terminal 11, the user can select execution of the update, and this provides convenience to the user.

In the present embodiment, when the communication terminal 11 has to carry out the forced update, the forced update is executed without allowing the user to select cancellation of the update, and therefore, this prevents inability to execute the original functions of the communication terminal 11 due to an update other than the communication terminal 11 such as the relay device 30.

In addition, in the present embodiment, the configuration in which the remote communication management server 50 and the update server 60 are separately provided is shown as the example, but the present embodiment is not limited thereto. For example, a server device may be provided, and the server device may be configured to include the functions of the remote communication management server 50 and the functions of the update server 60.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication device comprising:
a processor configured to
determine whether a dependency version of information is newer than a device version which is a current version of update of the communication device when a version of a target update included in first metainformation is newer than the device version, the first metainformation indicating the target update required for a program of the communication device and being from an update information providing device, the dependency version being another version of update dependent upon the target update,
transmit to the update information providing device a request for second metainformation indicating an update for the dependency version when the dependency version is newer than the device version, but not transmit to the update information providing device the request for the second metainformation when the dependency version is not newer than the device version, and
execute the update for the dependency version on the basis of the second metainformation transmitted from the update information providing device and execute the target update on the basis of the first metainformation after executing the update for the dependency version, wherein the processor is further configured to
when the dependency version is not newer than the device version, determine whether the target update is a critical update or not based on the first metainformation received from the update information providing device, and
when the target update is the critical update, force the target update to be executed.

2. The communication device according to claim 1, wherein the processor further determines whether the version of the target update is newer than the device version.

3. The communication device according to claim 2, wherein the processor further updates the device version to the version of the target update after executing the target update.

4. The communication device according to claim 1, wherein
the first metainformation and the second metainformation each include a storage location of a packaged file including the corresponding update and a script indicating a procedure of execution of the corresponding update, and
the processor receives the packaged file from the storage location specified and executes the script in the packaged file to execute the corresponding update.

5. The communication device according to claim 1, wherein the processor is further configured to determine whether the target update is a normal update or the critical update when the dependency version is not newer than the device version.

6. The communication device according to claim 5, wherein the critical update corresponds to an update associated with a change of a device or a function to which a current function of the communication device cannot respond.

7. The communication device according to claim 5, wherein the processor determines whether the target update is the normal update or the critical update based on the first metainformation received from the update information providing device.

8. The communication device according to claim 1, wherein the processor is further configured to, when the dependency version is not newer than the device version, determine whether the target update is a normal update or the critical update based on a flag set in the first metainformation received from the update information providing device.

9. The communication device according to claim 8, wherein the processor is further configured to
when the target update is not the critical update, allow a user to select the target update to be executed or not.

10. An update method executed by a communication device, the update method comprising:
determining whether a dependency version of information is newer than a device version which is a current version of update of the communication device when a version of a target update included in first metainformation is newer than the device version, the first metainformation indicating the target update required for a program of the communication device and being from an update information providing device, the dependency version being another version of update dependent upon the target update;
transmitting to the update information providing device a request for second metainformation indicating an update for the dependency version when the dependency version is newer than the device version, but not transmitting to the update information providing device the request for the second metainformation when the dependency version is not newer than the device version;
executing the update for the dependency version on the basis of the second metainformation transmitted from the update information providing device and executing the target update on the basis of the first metainformation after executing the update for the dependency version;
when the dependency version is not newer than the device version, determining whether the target update is a critical update or not based on the first metainformation received from the update information providing device; and
when the target update is the critical update, forcing the target update to be executed.

11. A non-transitory computer-readable storage medium with an executable program stored thereon, wherein the program instructs a processor of a communication device to perform:
determining whether a dependency version of information is newer than a device version which is a current version of update of the communication device when a version of a target update included in first metainformation is newer than the device version, the first metainformation indicating the target update required for a program of the communication device and being from an update information providing device, the dependency version being another version of update dependent upon the target update;

transmitting to the update information providing device a request for second metainformation indicating an update for the dependency version when the dependency version is newer than the device version, but not transmitting to the update information providing device the request for the second metainformation when the dependency version is not newer than the device version;

executing the update for the dependency version on the basis of the second metainformation transmitted from the update information providing device and executing the target update on the basis of the first metainformation after executing the update for the dependency version;

when the dependency version is not newer than the device version, determining whether the target update is a critical update or not based on the first metainformation received from the update information providing device; and when the target update is the critical update, forcing the target update to be executed.

* * * * *